United States Patent [19]

Van Keimpema et al.

[11] Patent Number: 4,726,866
[45] Date of Patent: Feb. 23, 1988

[54] PROCESS AND DEVICE FOR CONNECTING TOGETHER BY HEATED-TOOL BUTT-WELDING A VESSEL BODY OBTAINED BY EXTRUSION AND A VESSEL LID

[75] Inventors: Gerrit J. Van Keimpema, Woerden; Bernard J. DeLoos, Voorschoten; Edward J. Farrington, Vinkeveen, all of Netherlands

[73] Assignee: Koninklijke Emballage Industrie Van Leer B.V., Amstelveen, Netherlands

[21] Appl. No.: 883,122

[22] Filed: Jul. 8, 1986

[30] Foreign Application Priority Data

Jul. 15, 1985 [NL] Netherlands ............ 8502035

[51] Int. Cl.$^4$ .................................. B32B 31/04
[52] U.S. Cl. .......................... 156/69; 156/165; 156/304.2; 156/391; 156/499; 206/508
[58] Field of Search .......... 156/69, 165, 294, 304.2, 156/391, 423, 499; 206/508

[56] References Cited

U.S. PATENT DOCUMENTS

| 3,240,644 | 3/1966 | Wolff ................................ 156/165 |
| 3,272,671 | 9/1966 | Gaylord et al. .............. 156/165 X |
| 4,188,249 | 2/1980 | Fujio ................................ 156/165 |
| 4,280,268 | 7/1981 | Gordon ........................ 156/165 X |
| 4,519,859 | 5/1985 | Roth et al. ......................... 156/69 |

FOREIGN PATENT DOCUMENTS

| 7507820 | 1/1977 | Netherlands . |
| 1535287 | 12/1978 | United Kingdom . |
| 2085354 | 4/1982 | United Kingdom . |

Primary Examiner—Robert A. Dawson
Attorney, Agent, or Firm—Brumbaugh, Graves, Donohue & Raymond

[57] ABSTRACT

Process and device for connecting together an extruded plastic cylindrical vessel body (2) with a plastic lid (1) by means of butt-welding of edges (4,5) heated with a heated plate (12) the said lid being deformed elastically to a larger diameter prior to butt-welding, the device for expanding the lid (1) having a conical expansion element (9), a supporting ring (10) and locking elements (11) holding the expanded lid at a diameter corresponding to the edge diameter of the body (2).

2 Claims, 4 Drawing Figures

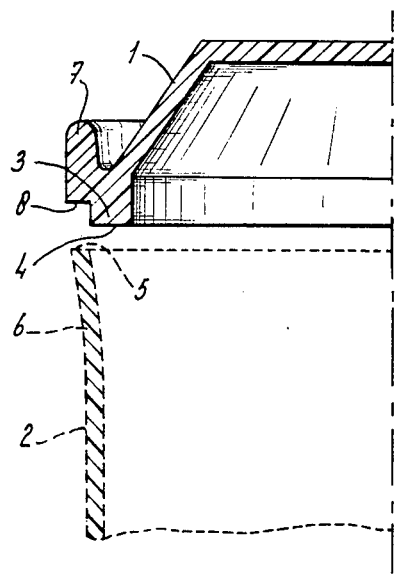
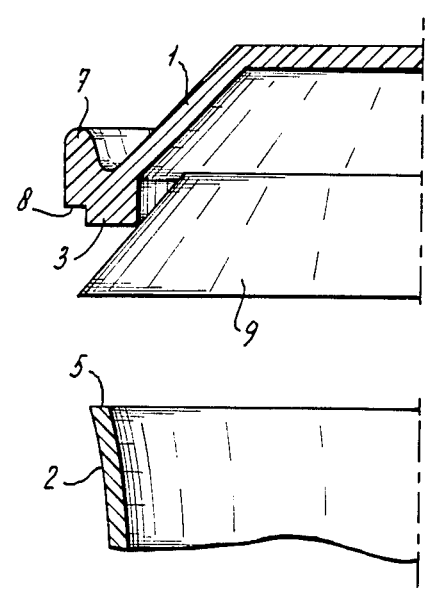
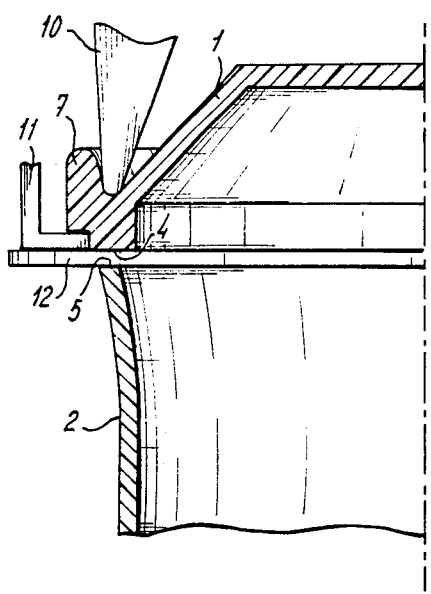
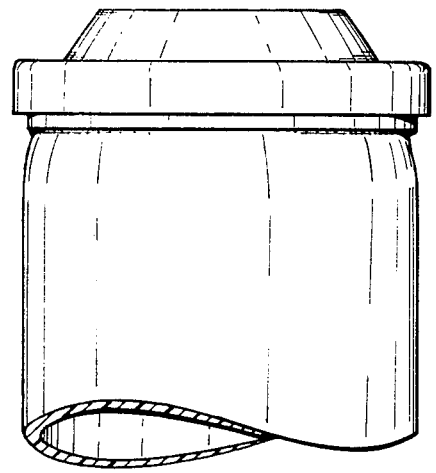

PROCESS AND DEVICE FOR CONNECTING TOGETHER BY HEATED-TOOL BUTT-WELDING A VESSEL BODY OBTAINED BY EXTRUSION AND A VESSEL LID

BACKGROUND AND SUMMARY OF THE INVENTION

The invention relates to a process for connecting together by heated-tool butt-welding a vessel body obtained by extrusion and a vessel lid which has a circular rim.

Such a process is known from British Pat. No. 1,535,287.

The vessel body used therein is cylindrical in shape. The finished vessel can, according to British Pat. No. 1,535,287, be subjected to internal excess pressure in order to give the vessel body a barrel shape, i.e. preferably a shape in which a large centre section of the body is a cylinder of greater diameter with adjoining barrel-shaped end parts.

This shape is advantageous for stability in respect of axial forces acting eccentrically upon the edge parts as a result of stacking of pallets, and in particular it prevents the vessel wall from being permanently or otherwise dented in the vicinity of the welded seam.

A disadvantage of this process is that the vessel body is not inherently stable before it is connected to a lid. This instability arises from the cylindrical shape and the thin wall of the vessel body. The result of this is that special measures have to be taken to preserve the cylindrical shape of the vessel body during production of the barrel.

Another disadvantage is that a separate treatment and expensive equipment are needed to shape the vessel body to a barrel form.

It has also been found that, despite precautionary measures, stresses may remain in the region round the weld seams of the finished product.

The object of the invention is therefore to produce a process which does not have these disadvantages.

This object is achieved according to the invention in that the edge of the lid is deformed elastically by mechanical means to a dimension which corresponds to the dimension of the edge of the vessel body, body and lid are welded together in this state and, after cooling of the weld, the deformation of the lid is removed. With this process, it is possible to use a vessel body which has outward curved edges. Such a vessel body is stable even when not connected, because the curled edges act as flanges. With a circular lid or body wall end the dimension is determined by the diameter. The edges are then bent outwards in the radial direction.

Such a form of the vessel body can be obtained by starting from an extruded tubular object whose inside is subjected to greater cooling than the outside. In such an object compression stresses prevail on the inside and tensile stresses on the outside of the wall. After cutting through perpendicular to the axis of the object, the axial components of these stresses make the cut edge curl outwards.

To the vessel body thus obtained, whose ends curl outwards, a lid is now connected by means of heated-tool butt-welding. The edge of this lid is stretched in axially symmetrical fashion to such an extent that when the lid has sprung back the vessel body has a barrel shape. During the elastic springing back of the lid the plastic material of the adjoining part of the vessel is still warm, as a result of which the geometrical change in the vicinity of the weld point can take place without internal stresses being built up.

In the process according to the invention, as can be seen from the above, no special measures need be taken to preserve the shape of the vessel body during the manufacture of the vessel. Nor is it necessary to subject the finished vessel to a separate treatment in order to make it a barrel shape.

The device for carrying out the process can be designed in such a way that it consists of a supporting ring gripping the outside edge of the lid in such a way that it can hold the edge of the lid in the expanded state, for example radially, a conical expansion element which is movable in the open side of the lid away from and in the edge towards the supporting ring, and locking elements which can engage all round the periphery of the lid with an edge of the lid situated near the welding point, and which keep the lid in contact with the supporting ring.

The supporting ring rests here against the inside edge of a ring disposed on the side facing away from the open side, and it retains the lid in the expanded position when the conical element has been removed in order to make the lid accessible for the butt-welding. The lid is held in place here by a locking element which presses the lid in the axial direction against the supporting ring. For this, provision is made for a supporting surface which springs back relative to the weld surface, so that it remains accessible for the heated-tool butt-welding.

The invention will be explained in greater detail with reference to the drawing.

BRIEF DESCRIPTION OF THE DRAWINGS

FIG. 1 shows a lid and the vessel body with outward curled edge.

FIG. 2 shows the lid with the conical expansion element.

FIG. 3 shows the heating of the edge of the vessel body to be attached and of the expanded vessel lid.

FIG. 4 shows the finished barrel.

DETAILED DESCRIPTION OF THE PREFERRED EMBODIMENTS

FIG. 1 shows a vessel lid 1 and a vessel body 2. The vessel lid 1 has a circular edge 3 with an attachment surface 4 which must be attached to the attachment surface 5 of the outward curled edge 6 of the vessel 2. The vessel lid 1 also has a ring 7 and an edge 8 situated next to the attachment surface 4.

FIG. 2 shows a conical expansion element 9, which rests against the inside of the circular edge 3. When this element is pressed into the circular edge 3, the lid obtains the desired diameter.

FIG. 3 shows the device with which the lid 1 is held in the expanded state after the expansion element 9 has been removed.

Against the ring 7 presses a supporting ring 10; the lid 1 is held against the supporting ring 10 by means of a locking element 11.

Also illustrated is a heated plate 12, which heats the attachment surfaces 4 and 5 for the heated-tool butt-welding. Once these surfaces are sufficiently heated, the plate 12 is removed and the surfaces 4 and 5 pressed against each other. After cooling of the weld, the supporting ring 10 and the locking element 11 are removed, as a result of which the lid can spring back and the vessel becomes a barrel shape, as shown in FIG. 4.

We claim:

1. A process for connecting together by heatedtool butt-welding a vessel body obtained by extrusion and a vessel lid which has a capable rim, comprising elastically deforming the edge of the lid by mechanical means to a dimension which corresponds to the dimension of the edge of the vessel body, welding the vessel body and lid together in this state, cooling the weld, and removing said deformation of the lid after cooling.

2. A device for the application of the process according to claim 1 comprising a vessel body obtained by extrusion having a first attachment surface, a vessel lid to be connected by heated-tool buttwelding to said vessel body having a circular rim and a second attachment surface, a supporting ring for gripping an outside edge of the lid in such a manner that it can hold the edge of the lid in an expanded state, a conical expansion element which is movable in the open side of the lid away from said supporting ring and in the edge towards said supporting ring, locking elements for keeping the lid in contact with the supporting ring and which engage with the periphery of the lid at an edge of the lid near the welding point, heating means for heating said first and second attachment surfaces for heated-tool butt-welding, and means for pressing and holding together said first and second attachment surfaces after said surfaces have been sufficiently treated by said heating means.

* * * * *

UNITED STATES PATENT AND TRADEMARK OFFICE
CERTIFICATE OF CORRECTION

PATENT NO. : 4,726,866

DATED : Feb. 23, 1988

INVENTOR(S) : Van Keimpema et al.

It is certified that error appears in the above-identified patent and that said Letters Patent is hereby corrected as shown below:

Col. 3, line 5, "heatedtool" should read --heated-tool--;

line 7, "capable" should read --circular--.

Col. 4, line 1, "buttweld" should read --butt-weld- --.

Signed and Sealed this

Twelfth Day of July, 1988

Attest:

DONALD J. QUIGG

Attesting Officer

Commissioner of Patents and Trademarks